C. C. BREEDEN & O. T. WHEELER.
Rotary Cultivator.
No. 198,339. Patented Dec. 18, 1877.
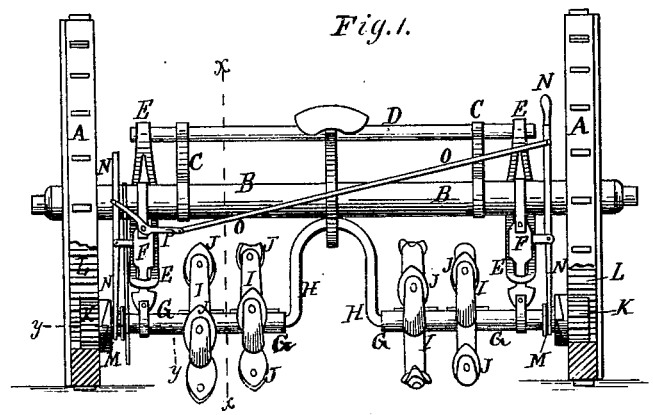
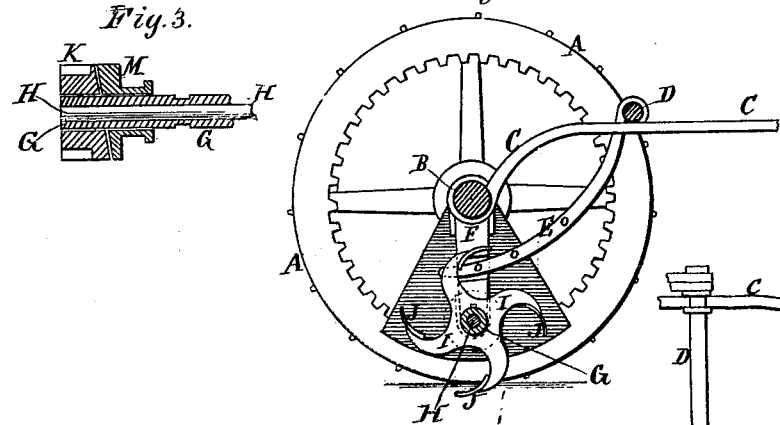
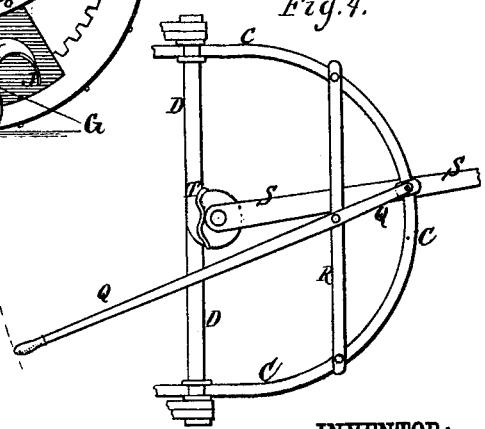

UNITED STATES PATENT OFFICE.

CHARLES C. BREEDEN AND OWEN T. WHEELER, OF BEDFORD, KENTUCKY.

IMPROVEMENT IN ROTARY CULTIVATORS.

Specification forming part of Letters Patent No. 198,339, dated December 18, 1877; application filed November 6, 1877.

*To all whom it may concern:*

Be it known that we, CHARLES C. BREEDEN and OWEN THOMAS WHEELER, of Bedford, in the county of Trimble and State of Kentucky, have invented a new and useful Improvement in Rotary Cultivator, of which the following is a specification:

Figure 1 is a rear view of our improved cultivator. Fig. 2 is a detail section of the same, taken through the line $x\ x$, Fig. 1. Fig. 3 is a detail section of the same, taken through the line $y\ y$, Fig. 1. Fig. 4 is a detail top view of the forward part of the frame.

Similar letters of reference indicate corresponding parts.

The object of this invention is to furnish an improved cultivator which shall be simple in construction and effective in operation, stirring the ground thoroughly, and leaving its surface smooth, and which shall be of light draft, and may be adjusted to work at any desired closeness to the plants.

The invention consists in the combination of the sleeves, the bent shaft, and the plow-wheels with the swinging bars, the loops, the axle, the bars or frame, and the driving-gearing, as hereinafter fully described.

A represents the wheels, which revolve upon the journals of the axle B. To the axle B are attached the ends of a U-bar, C, to which and to a cross-bar, D, attached to it, is attached the tongue. To the ends of the cross-bar D are pivoted the ends of two loops, E, which are curved to the rearward, and through the openings of which pass the swinging bars F. The bars F have shoulders formed upon their sides for the loops E to rest upon, and their upper ends are hung from the axle B by straps or other suitable means. In straps or other suitable bearings attached to the lower ends of the swinging bars F revolve sleeves G, which are placed and revolve upon the end parts of the shaft H. The middle part of the shaft H is arched, to pass over the plants without injuring them, and is connected at the center of the said arch with the center of the axle B by a strap or other suitable means. I represents wheel-plows, which are made by forming curved arms upon hubs, which arms have plows J attached to their ends. The hubs of the wheel-plows I are placed upon the sleeves G—two upon each sleeve—and are secured in place adjustably by grooves and keys, or other suitable means.

The plow-wheels I are designed to be so arranged upon the sleeves G that only two plows J can operate upon the ground at the same time. By this construction the plow-wheels I can be readily adjusted upon the sleeves G to work at any desired closeness to the plants.

K represents small gear-wheels, which revolve loosely upon the outer ends of the sleeves G, and the teeth of which mesh into the teeth of the large gear-wheels L, attached to or formed upon the wheels A. Upon the inner ends of the hub of the gear-wheels K are formed clutch-teeth, to engage with the teeth of the clutches M, that slide upon the outer parts of the sleeves G, so that the wheels A may be made to carry the plow-wheels I with them in their revolution, when desired.

The two clutches M are thrown into and out of gear with the gear-wheels K at the same time by the levers N, the lower ends of which ride in ring-grooves in the hubs of the said clutches, and which are pivoted to the swinging bars F. The upper end of one or both the levers N projects into such a position that it can be reached and operated by the driver from his seat.

The two levers N are connected by a connecting-rod, O, and a bent lever, P, so that they may both be operated to throw both the clutches M into and out of gear at the same time by the movement of either.

The plow-wheels I may be adjusted for the plows J to enter the ground to any desired depth, or to be carried above the ground, by passing pins through one or the other of the holes in the loops E at the rear sides of the swinging bars F.

The gear-wheels K L may be protected from the soil thrown by the plow-wheels I J by the fenders hung from the axle B, and through the lower parts of which the sleeves G pass.

By this construction, when the gear-wheels are thrown out of gear, the plows will rise out of the ground and run forward like the wheel of a wheelbarrow, and will again enter the ground when the said gear-wheels are thrown into gear.

The machine is guided by a lever, Q, which is pivoted to a cross-bar, R, of the frame. The forward end of the lever Q is pivoted to the tongue S, and its rear end projects back into such a position that it may be conveniently reached and operated by the driver from his seat. The lever Q is held in position, when adjusted, by a catch, T, attached to the cross-bar D. The tongue S is pivoted, at its rear end, to the cross-bar D, and is connected with the bend of the U-bar C by a keeper, so that the machine may be guided by operating the lever Q.

Having thus described our invention, we claim as new and desire to secure by Letters Patent—

The combination of the sleeves G, the bent shaft H, and the plow-wheels I J with the swinging bars F, the loops E, the axle B, the bars or frame C D, and the driving-gearing K L A, substantially as herein shown and described.

CHARLES CALVIN BREEDEN.
OWEN THOMAS WHEELER.

Witnesses:
JAMES E. MORRISS,
THOMAS S. KIDWELL.